Oct. 20, 1970  B. E. RESENER ET AL  3,534,848
FOLD DOWN LUG FOR CHAINS
Filed June 19, 1968
3 Sheets-Sheet 1
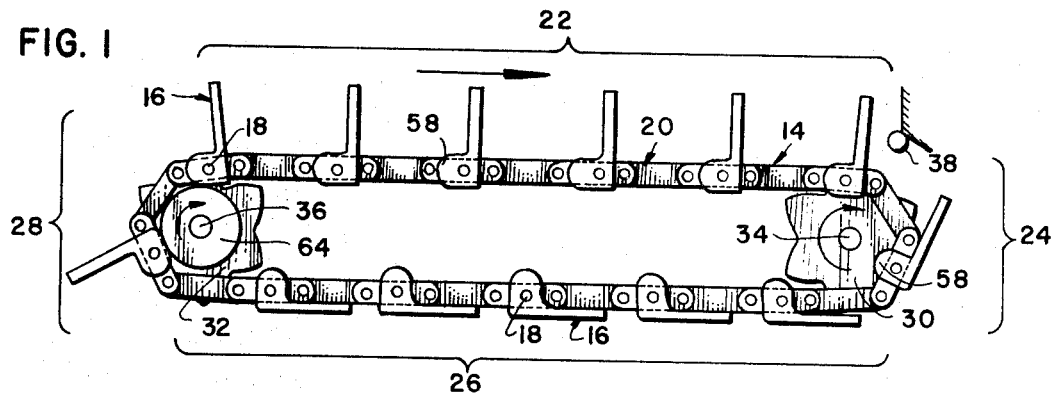
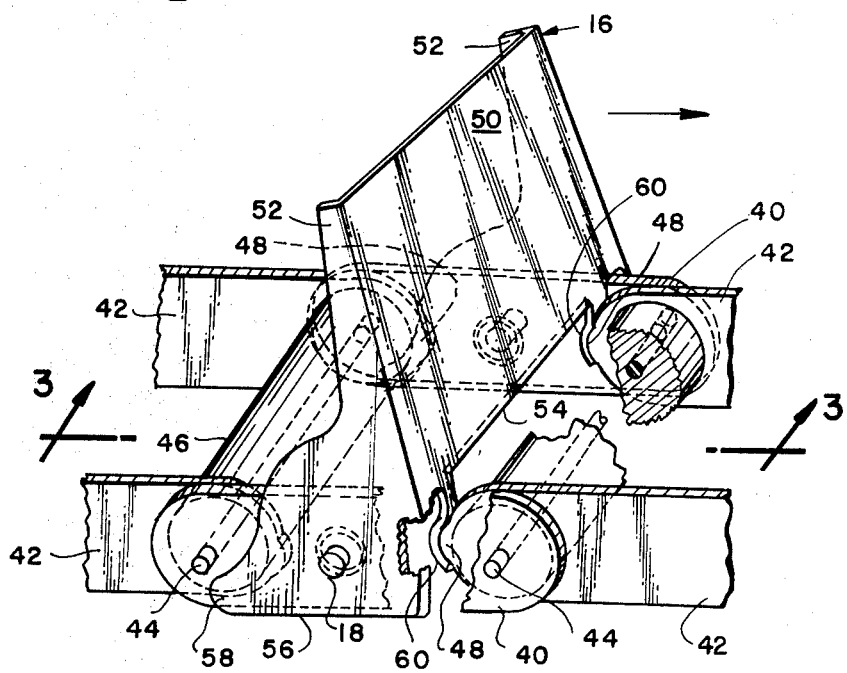
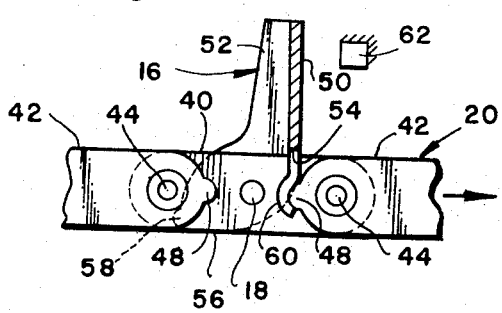
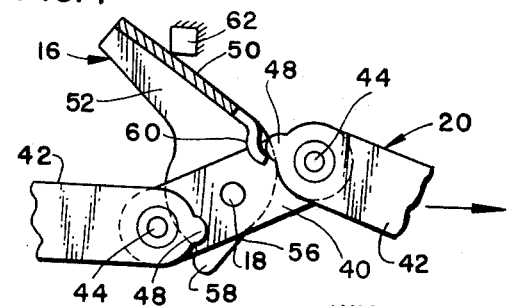
INVENTORS
BAIRD EUGENE RESENER
AND CHARLES FREDERICK MARKS
ATT'Y Oct. 20, 1970  B. E. RESENER ET AL  3,534,848
FOLD DOWN LUG FOR CHAINS Filed June 19, 1968

INVENTORS
BAIRD EUGENE RESENER
AND CHARLES FREDERICK MARKS

Oct. 20, 1970   B. E. RESENER ET AL   3,534,848
FOLD DOWN LUG FOR CHAINS
Filed June 19, 1968   3 Sheets-Sheet 3

INVENTORS
BAIRD EUGENE RESENER
AND CHARLES FREDERICK MARKS

United States Patent Office 3,534,848
Patented Oct. 20, 1970

3,534,848
FOLD DOWN LUG FOR CHAINS
Baird Eugene Resener and Charles Frederick Marks,
Indianapolis, Ind., assignors to AMSTED Industries Incorporated, Chicago, Ill., a corporation of Delaware
Filed June 19, 1968, Ser. No. 738,300
Int. Cl. B65g *19/26*
U.S. Cl. 198—170
9 Claims

ABSTRACT OF THE DISCLOSURE

A material handling conveyor has a plurality of foldable lugs pivotally connected to a chain. In extension, mating means on the lugs contact cams on the chain. Relative angular movement of adjacent chain links space the mating means and the cams permitting an extended lug to be folded. Means are provided to extend a folded lug and re-engage the mating means and the cams.

---

This invention relates generally to conveyor means and more particularly to material handling conveyors having retractable lugs or equivalent material engaging members.

This invention finds particular utility in material handling conveyors where the fold down feature of the material engaging member, e.g., lug, may be exploited to facilitate conveyor design, and to reduce chain and member damage where an overload condition arises or the conveyor jams or clogs. A significant feature of this fold down member is that it will not retract into its folded position until a predetermined degree of angular movement has occurred between adjacent links. The fact that the member has only two positions, folded down or extended, may be further exploited in material handling conveyors having only a minimal amount of space on the return or slack span. The member may be folded by a stationary sweep at the end of the operational or tight span during angular movement of adjacent links resulting from movement of the chain around a sprocket wheel. Means may also be provided to reset a folded member into an extended position at a predetermined position. A hub on a sprocket wheel may be used to contact a trailing edge of the folded member as the chain moves around the sprocket wheel thereby forcing the lug into an extended position.

The foregoing and other objects and advantages of the invention will become apparent from the following description and accompanying drawings, wherein:

FIG. 1 is a side elevational view of an endless retractable lug conveyor embodying features of this invention;

FIG. 2 is a perspective view, partly in section, of an extended lug shown on FIG. 1;

FIG. 3 is a sectional view taken on line 3—3 of FIG. 2 illustrating a lug in an operative position approaching an obstruction;

FIG. 4 is a sectional view comparable to FIG. 3 but showing link angulation in the conveyor resulting from the lug contacting an obstruction;

Figure 5:
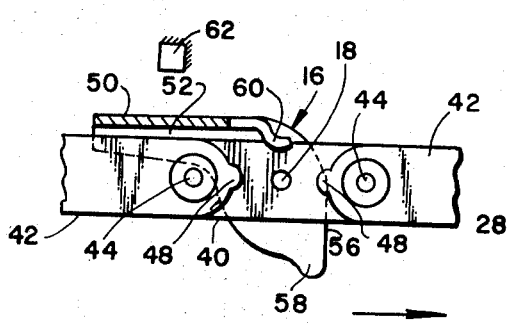
FIG. 5 is a sectional view comparable to FIGS. 3 and 4 but showing the lug in retracted position.

Describing the invention in detail and referring to the embodiment shown in FIGS. 1–6 of the drawings, in which FIG. 1 illustrates an endless retractable lug conveyor, generally designated 14, the novel device comprises retractable lugs 16, pivotally connected at 18 to the sides of a roller type chain, generally designated 20. The conveyor 14 has a tight or operational span 22, a retraction loop 24, a slack or return span 26 and a set up loop 28. The retraction and set up loops 24 and 28 are trained upon rotary parts, here in the form of straight and hubbed sprocket wheels 30 and 32 respectively. These sprocket wheels 30 and 32 are carried on shafts 34 and 36 whose axes are normal to the general plane of the conveyor 14. Striking means 38 is shown in FIG. 1 located over the retraction loop 24.

A portion of the conveyor 14 moving through the operational span 22 is shown in FIG. 2. The chain 20 comprises a plurality of opposed, alternately spaced pin link plates 40 and roller link plates 42 pivotally interconnected by pins 44 extending through rollers 46. The ends of the roller links 40 comprise arcuate cams 48.

A fold down lug 16 having a planar pusher face 50 interconnecting parallel, opposed sides 52 straddling the outer surfaces of opposed pin link plates 40, is pivotally connected thereto at 18 by appropriate fasteners. The bottom edge 54 of the pusher face 50 mates with the top edge of the pin links 40, thereby retarding forward movement of the lug 16 in the direction of the chain's travel.

The sides 52 of the lug 16 are angular and have bottom edges 56 which are coplanar to the bottom edges of the pin links 40 when the lug is in an extended position, as shown in FIG. 2. Tails 58, partially defined by the edges 56, project backward, opposite the direction of chain travel, and are part of the angular sides 52. When the lug 16 is extended, the tails 58 are proximate the pin links 40, as illustrated in FIGS. 2 and 3, and when the lug 16 is folded, as shown in FIG. 5, the tails 58 protrude downwardly away from the pin links 40. Opposed arcuate fingers 60 project downwardly from the pusher face 50 proximate the pin links 40 and are in mating engagement with the cams 48 when the lug 16 is extended. The fingers 60 may be so constructed as to be biased against the cams 48 in a spring-like manner.

As shown in FIGS. 3 through 5, an obstruction 62 in the lug's line of travel contacts the face 50 during the operational span 22 folding the lug 16. In FIG. 3, one-half of the lug 16 is illustrated in its normal operational position. The arcuate finger 60 is biased against the cam 48 holding the lug in an extended position. As contact is made between the face 50 and an obstruction 62, as shown in FIG. 4, the chain 20 tightens forcing the finger 60 further against the cam 48 resulting in a greater force to maintain the lug in its extended position. As the tension between the links 40 and 42 increases, angular movement between the pin and roller links is resisted thus providing a type of load reactive action in the chain 20. In the absence of the obstruction 62 giving way to the force exerted by the lug 16, the chain 20 begins to fold, moving the finger 60 out of engagement with the cam 48 as the lug 16 pivots at 18 on the pin link 40. After a predetermined degree of angular movement between adjacent pin links 40 and roller links 42, e.g., 30 degrees, the finger 60 moves out of contact with the cam 48 leaving the lug 16 in a nonoperational position. In the absence of this contact, the force exerted on the lug 16 by the movement of the chain 20 relative to the obstruction 62, forces the lug 16 to pivot at 18, thereby folding it as shown in FIG. 5, causing the tail 58 to extend below the chain 20.

In FIG. 1 it may readily be seen that as an extended lug 16 moves around the retraction loop 24 the pin and roller links move angularly relative to each other a number of degrees equal to 360 degrees/$n$, where $n$ equals the number of teeth on the sprocket wheel 30. By designing the fingers and cams to move out of or into engagement at a degree of link angulation equal to or less than 360 degrees/$n$, an extended lug 16 may be folded on sprocket wheel 30 by providing a striker 38 to contact the face 50 after the link angulation has occurred. Once the lug 16 is folded and the chain 20 resumes a straight run, interference between the fingers 60 and the top of the respective cams 48 prohibits extension of the lug.

Figure 6:
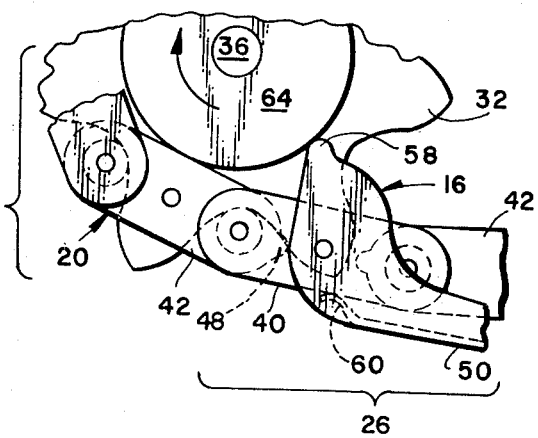
FIG. 6 is an enlarged, fragmentary side elevational view of the return span and set up loop illustrating the tail of a lug contacting the hub of a sprocket wheel.

When the lug 16 moves around to the set-up loop 28 adjacent pin and roller links will move angularly relative to each other around the sprocket wheel 32. By providing sprockets on sprocket wheel 32 equal to or less than those on sprocket wheel 30, proper link angulation will occur to reset a folded lug. As the lug 16 moves toward the hubbed sprocket wheel 32, the tail 58 contacts the hub 64, as shown in FIG. 6, forcing the lug 16 to move toward an extended position. As the chain 20 moves further around the sprocket wheel 32 the adjacent pin and roller links 40 and 42 move angularly relative to each other, permitting engagement of the fingers 60 and respective cams 48. The hub 64 and tail 58 are designed so that the lug 16 will not be extended until the proper degree of link angulation has occurred for engagement of the fingers 60 and cams 48. As the extended lug 16 moves into the operational span 22, the chain 20 is again straightened and mating contact is made between the fingers 60 and the cams 48, thereby retaining the lug 16 in its extended operational position by the force of said contact.

Figure 7:
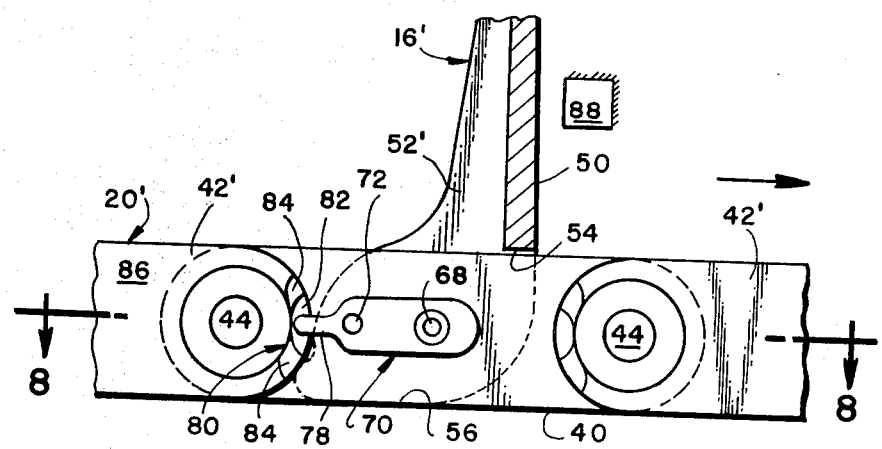
FIG. 7 is a sectional view comparable to FIG. 3 but illustrating another embodiment of the invention.
Figure 8:
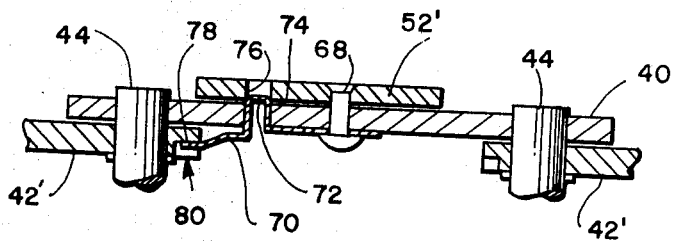
FIG. 8 is a sectional view taken on line 8—8 of FIG. 7.

Another embodiment of this invention is illustrated in FIGS. 7 through 13. In FIG. 7 a lug 16', fragmentarily illustrated, is pivotally connected to a pin link 40 by a fastener 68 extending through the pin link 40, the side 52' of the lug, and a spring, generally designated 70, which is biased against the pin link 40. A detent 72 in the spring 70 engages aligned, corresponding apertures 74 and 76 respectively located in the pin link 40 and the side 52'. The lug 16' is held in an extended, operational, fixed position relative to the pin link 40 by means of the fastener 68 and the detent 72 engaging the pin link 40 and the side 52'. Forward movement of the lug 16' is limited by contact between surface 54 and edges of links 40.

Figure 9:
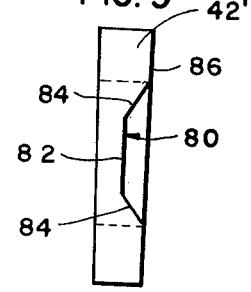
FIG. 9 is a front elevational view of a roller link shown in FIG. 7.
Figure 10:
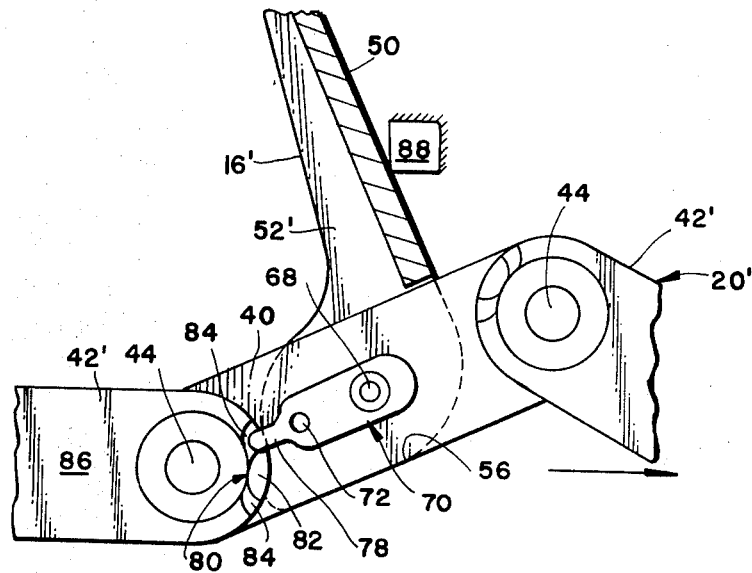
FIG. 10 is a sectional view comparable to FIG. 7 but illustrating angular movement between adjacent links resulting from the lug contacting an obstruction.

A tang 78 on the spring 70 engages a cup-shaped, angular cam surface, generally designated 80, located on the end of a roller link 42' and is held against that surface by the force of the biased spring 70. The cup-shaped, angular cam surface, as shown in FIGS. 7 and 9, comprises a flat dwell 82 and angular ramp dwells 84 interconnecting the side 86 of the roller link 42' and the flat dwell 82. During minor link angulation, e.g., plus or minus 10 degrees, the tang 78 will remain in contact with the flat dwell 82.

Figure 11:
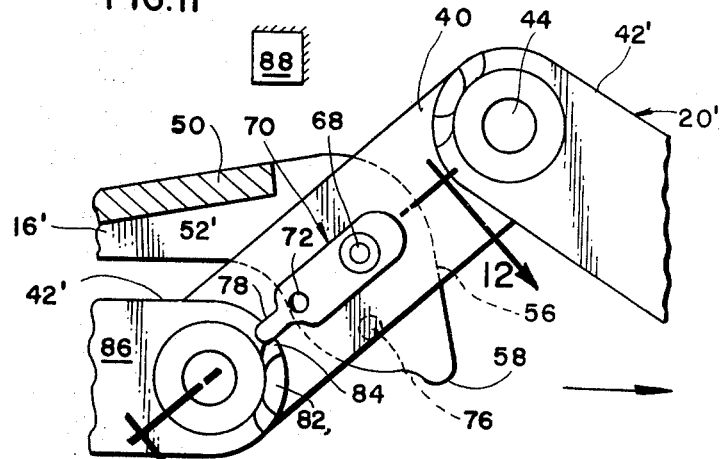
FIG. 11 is a sectional view comparable to FIG. 10 but illustrating the lug in a folding position.
Figure 12:
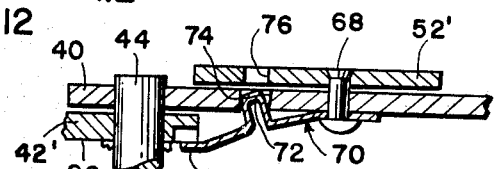
FIG. 12 is a sectional view taken on line 12—12 of FIG. 11.

As shown in FIGS. 7, and 10 through 12, as the extended lug 16' moves through its operational span 22 the tang 78 will be seated on the flat dwell 82. Upon contacting an obstruction 88, the lug 16' is forced backwards causing the pin links 40 to pivot on the pins 44 relative to the adjacent roller links 42'. As this link angulation occurs, the spring 70 moves with the pin link 40 causing the tang 78 to move across the flat dwell 82 and up along an angular ramp dwell 84. This movement forces the spring 70 away from the pin link 40, thereby forcing the detent 72 out of the aperture 76 in the side 52' of the lug 16'. As the tang 78 is forced off the angular ramp dwell 84 onto the side 86 of the roller link 42' by further angular movement between adjacent pin and roller links, the detent 72 is forced completely out of the aperture 76, permitting the lug 16' to pivot backwards on fastener 68 into a folded position as shown in FIGS. 11 and 12.

Figure 13:
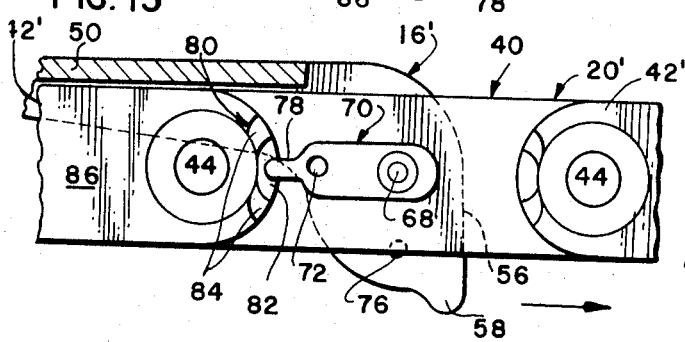
FIG. 13 is a sectional view comparable to FIG. 11 but showing the lug completely folded.

In the folded position, as shown in FIG. 13, the chain 20' returns to a normal straight run resulting in the tang 78 returning to a position relative to, but not in contact with, the flat dwell 82. Since the spring 70 is biased toward the pin link 40, the detent 72, extending through the aperture 74 in the pin link 40, is forced outward against the side 52' of the lug 16'. The force of the detent 72 against the side 52' of the lug 16' retains the lug in its folded position.

The lug 16' may also be retracted or extended in the respective loops 24 and 28 in the same manner as lug 16. In order to facilitate retraction and set up in these loops, the cam surface 80 must be so designed that the degree of angulation between a pin link and an adjacent roller link is equal to or less than 360 degrees/$n$, where $n$ represents the number of sprockets on the largest sprocket wheel, e.g., 30 or 32. This relative angular movement between adjacent pin and roller links results in the movement of the tang 78 relative to the cam surface 80, i.e., one-half of the flat dwell 82 plus one ramp dwell 84, thereby forcing the detent 72 out of the aperture 76 permitting the lug 16' to retract.

It is to be understood that the foregoing description and the accompanying drawings have been given only by way of illustration and example. It is also to be understood that changes in form of the elements, rearrangement of parts, and substitution of equivalent elements, which will be obvious to those skilled in the art, are contemplated as within the scope of the present invention.

What is claimed is:

1. A conveyor comprising: an endless flexible member having a plurality of links, means pivotally interconnecting said links end-to-end to afford a general straight run along which the links are strung out in chain fashion as the flexible member moves substantially linearly and a general curved run along which adjacent links pivot relative to each other about the interconnecting means when the flexible member bends: one or more material engaging members; pivotal means securing said material engaging members to certain links, respectively, for swinging movement relative to the flexible member between two positions; cam means secured to other links, respectively, adjacent said certain links; and mating means secured to respective material engaging members engageable with related cam means for releasably holding the material engaging members in one of said positions and spaced from the related cam means during the other position of the material engaging members, said mating means and said cam means being releasable during pivotal movement between said certain links and said other links.

2. The conveyor set out in claim 1 wherein the mating means secured to each material engaging member comprise arcuate fingers.

3. The conveyor set out in claim 1 wherein the links are alternately pin and roller links; each material engaging member is secured to pin links; the cam means are arcuate projections on the ends of roller links; and the mating means are characterized by arcuate fingers on each material engaging member.

4. The conveyor set out in claim 1 wherein the links are alternately pin and roller links; each material engaging member is pivotally secured to pin links; the cam means are cup-shaped, angular surfaces on adjacent roller links opening away from the pin links; and wherein spring plates are biased against and secured to respective pin links; the mating means are tangs on respective spring plates; and wherein locking means are secured to the spring plates for releasably engaging each material engaging member.

5. The conveyor set out in claim 4 wherein each material engaging member comprises apertures aligned with apertures in the pin links when the material engaging member is in one position and misaligned with respect to the apertures in the pin links when the material engaging member is in the other position; and the locking means comprises detents in the spring plates engageable with the apertures in the pin links and the apertures in the material engaging member to maintain alignment thereof when the tangs are engaging the angular surfaces, said detents being engageable with the apertures in the pin links and with surfaces of the material engaging member when the tangs are spaced from the angular surfaces.

6. A conveyor comprising: a chain having a plurality of alternate pin and roller links interconnected by pivots to afford a general straight run along which the links are strung out in a line as the chain moves in one direction and a general curved run along which adjacent links are angular when the chain bends; a plurality of rotating members having projections engageable with the pivots for moving the chain in an endless path; one or more material engaging members; pivotal means securing each material engaging member to pin links for swinging movement of the engaging member relative to the chain between two positions; cam means secured to adjacent roller links; and mating means secured to each material engaging member and engaged with the cam means for yieldingly holding the material engaging member in one of said positions and spaced from the cam means in said other position of the material engaging member said mating means being spaceable from the cam means during angulation between said adjacent pin and roller links.

7. The conveyor set out in claim 6 including contacting means comprising tails secured to each material engaging member protruding from the chain when the mating means is spaced from the cam means and proximate the chain when the mating means is engaged with the cam means, and a hub secured to a rotating member for contacting the protruding tails and forcing them proximate to the chain during link angulation around the rotating member.

8. The conveyor set out in claim 6 including a sweep located proximate a rotating member for contacting each material engaging member during link angulation around the rotating member to space the mating means and the cam means.

9. A conveyor comprising a plurality of sprocket wheels, a chain engaged therewith and comprising pivotally interconnected links, material engaging members pivoted to certain of said links, means on said members and other of said links for holding said members in material engaging position, said means being releasable in response to angular movement of adjoining links upon engagement of any of said members with an obstacle whereby the obstacle may pivot such member to another position, and means on said members and one of said sprocket wheels for moving said members to said material engaging position.

References Cited

UNITED STATES PATENTS

| | | | |
|---|---|---|---|
| 163,831 | 5/1875 | Whitney | 198—170 X |
| 2,714,441 | 8/1955 | Nolt | 198—170 |

EDWARD A. SROKA, Primary Examiner

U.S. Cl. X.R.

198—173